US011662985B2

(12) United States Patent
Michalakis et al.

(10) Patent No.: US 11,662,985 B2
(45) Date of Patent: *May 30, 2023

(54) VEHICLE DEVELOPER SYSTEMS, METHODS AND DEVICES

(71) Applicant: Woven Alpha, Inc., Tokyo (JP)

(72) Inventors: Nikolaos Michalakis, Tokyo (JP); Paul Sastrasinh, Tokyo (JP); Thor Lewis, Sunnyvale, CA (US); Shang-Poh Yu, Tokyo (JP); Sho Mikuriya, Yokohama (JP); Hiroko Okuyama, Tokyo (JP)

(73) Assignee: WOVEN ALPHA, INC., Tokyo (JP)

( * ) Notice: Subject to any disclaimer, the term of this patent is extended or adjusted under 35 U.S.C. 154(b) by 310 days.

This patent is subject to a terminal disclaimer.

(21) Appl. No.: 17/075,193

(22) Filed: Oct. 20, 2020

(65) Prior Publication Data

US 2021/0118246 A1 Apr. 22, 2021

Related U.S. Application Data

(60) Provisional application No. 62/923,733, filed on Oct. 21, 2019.

(51) Int. Cl.
*G06F 8/38* (2018.01)
*G06F 8/41* (2018.01)
(Continued)

(52) U.S. Cl.
CPC .............. *G06F 8/38* (2013.01); *B60W 10/06* (2013.01); *B60W 10/08* (2013.01); *B60W 10/10* (2013.01);
(Continued)

(58) Field of Classification Search
CPC ..... G06F 8/38; G06F 8/44; G06F 8/60; G06F 9/455; G06F 11/3664; G06F 11/3688;
(Continued)

(56) References Cited

U.S. PATENT DOCUMENTS 5,394,093 A * 2/1995 Cervas ..................... G01F 25/10
324/556
9,715,442 B2 * 7/2017 Alexander .......... G06F 11/3664
(Continued)

FOREIGN PATENT DOCUMENTS

WO 2013072925 A2 5/2013

OTHER PUBLICATIONS

Non-Final Office Action of U.S. Appl. No. 17/075,176 dated Apr. 18, 2022.
(Continued)

*Primary Examiner* — Hunter B Lonsberry
*Assistant Examiner* — Robert Louis Pinkerton
(74) *Attorney, Agent, or Firm* — Dinsmore & Shohl LLP

(57) ABSTRACT

Vehicle developer devices, systems and methods are disclosed. In one embodiment, a vehicle developer device includes a management computing device, a plurality of electronic control units, and a plurality peripheral devices, wherein one or more individual peripheral devices of the plurality of peripheral devices is a physical representation of an actual vehicle peripheral device. The vehicle developer device further includes a plurality of ports for receiving one or more of at least one additional electronic control units and at least one additional peripheral devices. The management computing device configures the plurality of electronic control units, and simulates operation of a full-scale simulated vehicle. The vehicle developer device is smaller in size than the full-scale simulated vehicle.

20 Claims, 14 Drawing Sheets

(51) Int. Cl.
  *G06F 9/455* (2018.01)
  *G06F 11/36* (2006.01)
  *G06F 8/60* (2018.01)
  *H04R 1/02* (2006.01)
  *B60W 60/00* (2020.01)
  *B60W 10/06* (2006.01)
  *B60W 10/08* (2006.01)
  *B60W 10/10* (2012.01)
  *B60W 10/18* (2012.01)
  *B60W 10/20* (2006.01)
  *B60W 10/22* (2006.01)
  *G07C 5/00* (2006.01)
  *G06F 3/14* (2006.01)

(52) U.S. Cl.
  CPC ............ *B60W 10/18* (2013.01); *B60W 10/20* (2013.01); *B60W 10/22* (2013.01); *B60W 60/001* (2020.02); *G06F 8/44* (2013.01); *G06F 8/60* (2013.01); *G06F 9/455* (2013.01); *G06F 11/3664* (2013.01); *G06F 11/3688* (2013.01); *G07C 5/008* (2013.01); *H04R 1/025* (2013.01); *B60W 2420/42* (2013.01); *B60W 2420/52* (2013.01); *G06F 3/14* (2013.01); *H04R 2499/13* (2013.01)

(58) Field of Classification Search
  CPC ......... G06F 3/14; B60W 10/06; B60W 10/08; B60W 10/10; B60W 10/18; B60W 10/20; B60W 10/22; B60W 60/001; B60W 2420/42; B60W 2420/52; G07C 5/008; H04R 1/025; H04R 2499/13
  USPC ........................................................... 701/23
  See application file for complete search history.

(56) References Cited

U.S. PATENT DOCUMENTS

| | | |
|---|---|---|
| 2007/0260372 A1 | 11/2007 | Langer |
| 2007/0260373 A1 | 11/2007 | Langer et al. |
| 2007/0260438 A1* | 11/2007 | Langer ................ G01M 17/007 703/8 |
| 2009/0066641 A1 | 3/2009 | Mahajan et al. |
| 2019/0210516 A1* | 7/2019 | Sata ................. G08G 1/096775 |
| 2019/0303759 A1* | 10/2019 | Farabet ................. G06V 20/56 |
| 2020/0167436 A1* | 5/2020 | Xiao ...................... G06F 30/20 |
| 2020/0298754 A1* | 9/2020 | Zhu ........................... B60T 7/22 |
| 2021/0276544 A1 | 9/2021 | Park |

OTHER PUBLICATIONS

U.S. Appl. No. 17/075,176, Final Office Action dated Oct. 7, 2022.

* cited by examiner

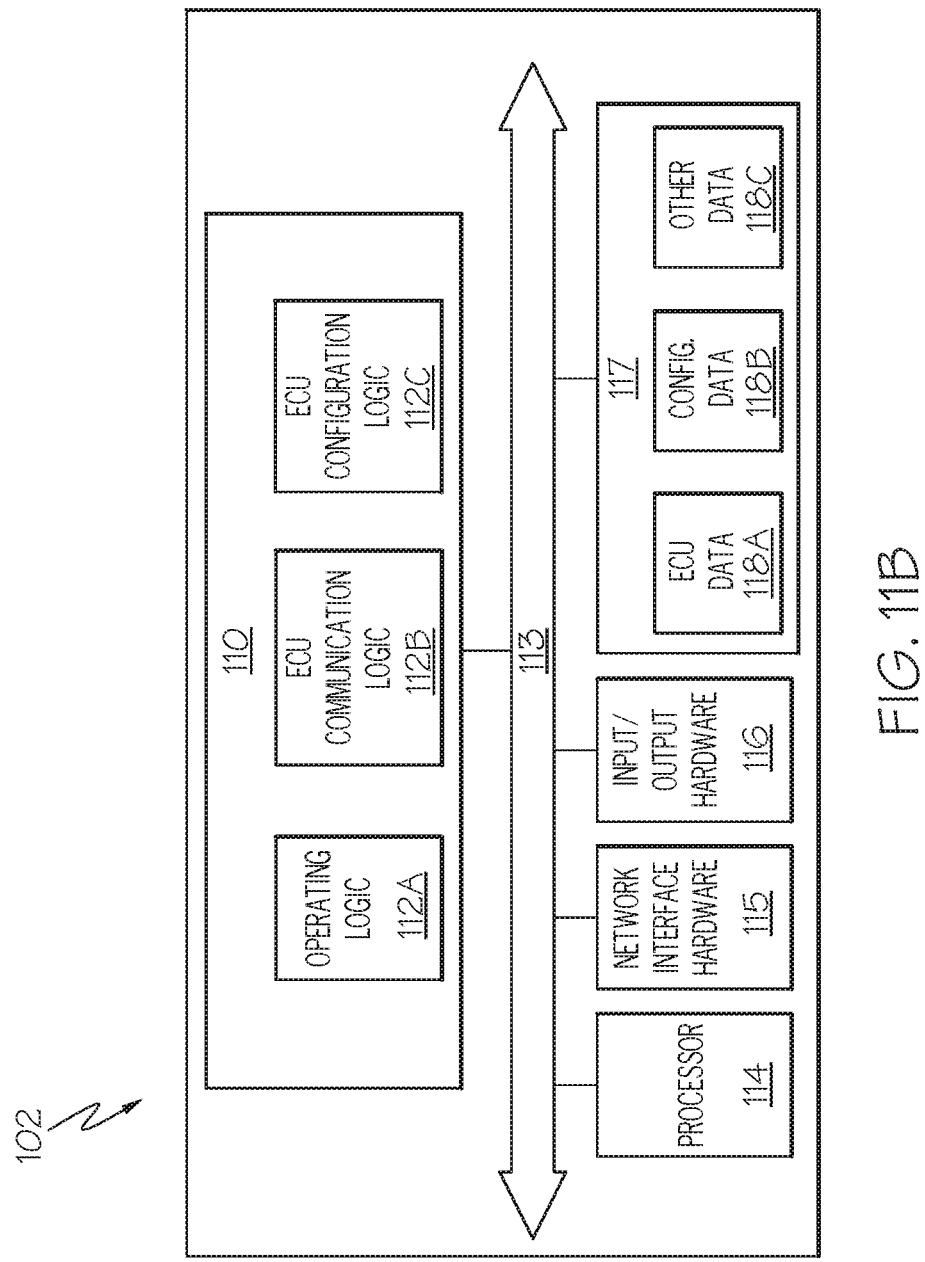

VEHICLE DEVELOPER SYSTEMS, METHODS AND DEVICES

CROSS-REFERENCE TO RELATED APPLICATIONS

The present application claims priority to U.S. Provisional Patent Application No. 62/923,733 filed on Oct. 21, 2019 and entitled "Systems and Methods for Vehicle Hardware and Software Development," the content of which is hereby incorporated by reference in its entirety.

BACKGROUND

Presently, vehicle hardware development is done by installing new hardware components, such as sensors and actuators, on test vehicles. The operation of the new hardware and the operation of the test vehicle is evaluated to determine if such operations are satisfactory. However, requiring an actual test vehicle is expensive and also slows down the development process. Third party suppliers may not always have a test vehicle available to test new vehicle products. Thus, hardware development may be a very cumbersome and expensive process.

Accordingly, alternative systems, devices and methods for developing hardware for vehicles may be desired.

SUMMARY

Embodiments of the present disclosure are directed to devices, systems and methods that aid in the development of software and hardware for deployment in vehicles.

The requirement of test vehicles to develop new software, hardware, and user interfaces significantly slows down the design process, and also presents significant costs to automobile manufacturers, suppliers and third party developers.

Embodiments of the present disclosure provide developer devices, systems and methods that enable rapid software, user interface, and hardware development that eliminate the need for test vehicles. Rather, software, user interfaces, and hardware may be developed and tested using scale model developer devices In one embodiment, a vehicle developer device includes a management computing device, a plurality of electronic control units, and a plurality peripheral devices, wherein one or more individual peripheral devices of the plurality of peripheral devices is a physical representation of an actual vehicle peripheral device. The vehicle developer device further includes a plurality of ports for receiving one or more of at least one additional electronic control units and at least one additional peripheral devices. The management computing device configures the plurality of electronic control units, and simulates operation of a full-scale simulated vehicle. The vehicle developer device is smaller in size than the full-scale simulated vehicle.

In another embodiment, a method of evaluating a peripheral device includes coupling an individual peripheral device to a vehicle developer device. The vehicle developer device includes a management computing device, a plurality of electronic control units, and a plurality peripheral devices, wherein one or more individual peripheral devices of the plurality of peripheral devices is a physical representation of an actual vehicle peripheral device. The vehicle developer device further includes a plurality of ports for receiving one or more of at least one additional electronic control units and at least one additional peripheral devices. The individual peripheral device is coupled to an individual port of the plurality of ports. The management computing device configures the plurality of electronic control units. The vehicle developer device simulates operation of a full-scale simulated vehicle. The vehicle developer device is smaller in size than the full-scale simulated vehicle. The method further includes operating the vehicle developer device, and evaluating an operation of at least one of the vehicle developer device and the individual peripheral device according to one or more performance metrics.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The drawings illustrate various embodiments and together with the description serve to explain the principles and operation.

BRIEF DESCRIPTION OF THE DRAWINGS

FIG. 11B schematically illustrates a management computing device of an example vehicle developer device according to one or more embodiments described and illustrated herein;

DETAILED DESCRIPTION

Figure 1:
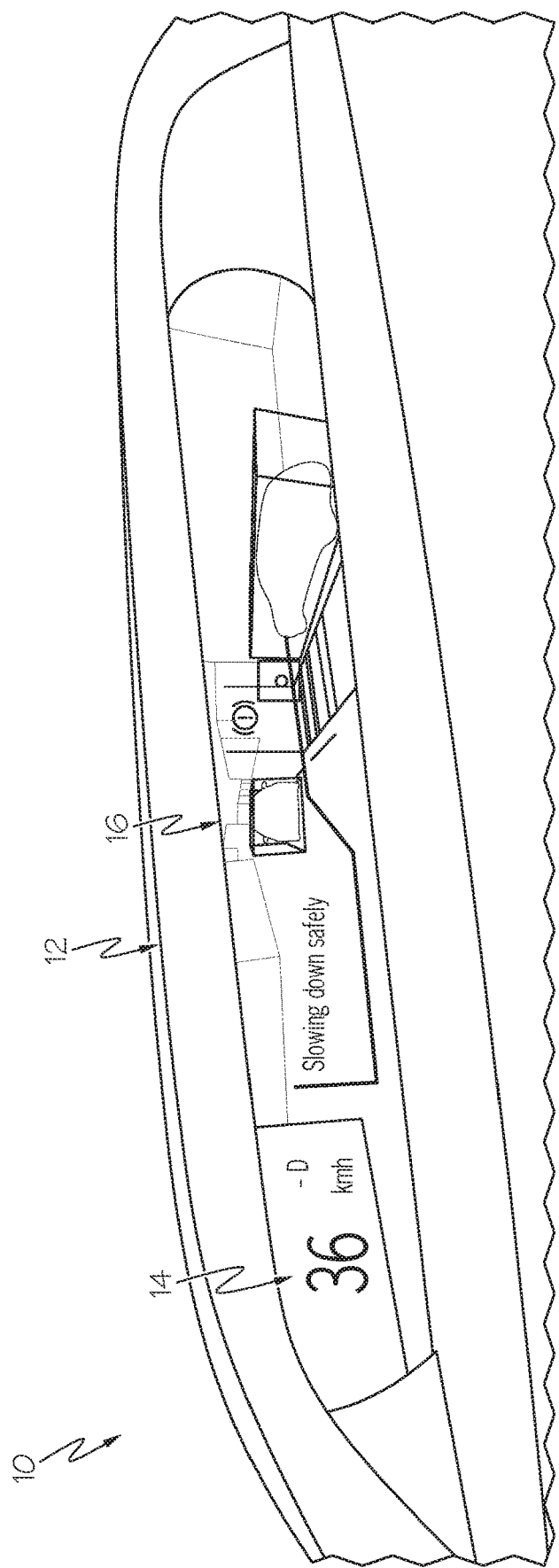
FIG. 1 schematically illustrates an example vehicle user interface according to one or more embodiments described and illustrated herein.

Embodiments of the present disclosure are directed to vehicle developer devices that provide for rapid development and testing of vehicle software, including user interfaces that do not require an actual testing vehicle. In one example, the vehicle developer devices and systems described herein enable software developers to easily develop and test software applications without requiring an actual vehicle to test their software.

Traditionally, vehicle software and hardware developers require a full-size test vehicle to rigorously test software code and/or hardware. The software and/or hardware is installed in the test vehicle, which is then operated according to test parameters. Feedback is then gathered regarding the performance of the software and/or hardware. However, developers, such as third party developers, may not have access to test vehicle and therefore may not be in a position to test software and/or hardware until much later in the development cycle. Further, test vehicles are large and expensive. Requiring a test vehicle is costly and slows down the development process.

Embodiments described herein provide a way for developers to easily evaluate software and/or hardware on actual vehicle hardware without requiring a full-scale test vehicle. As described in more detail below, the vehicle developer device is configured as a small vehicle developer device that has all necessary hardware components and connectors for one or more real vehicle electronic control units (ECU) that are deployed in a particular vehicle. In some embodiments, the vehicle developer device has development and debugging tools installed and can be customized using user interface components. As one example, a version of the vehicle developer device may resemble a small version of a vehicle so it can be placed on the ground and tested on a course (e.g., a miniature roadway).

The vehicle developer devices described herein make it easier for developers to write software for vehicles at least because developers will not require a real vehicle to test code. In some embodiments, the vehicle developer device may abstract away various vehicle components so the developer may focus on functionality that is of concern. As a non-limiting example, the vehicle developer device may include hardware features that represent features of the vehicles, such as LEDs that represent tail lights, or small actuators that represent a brake pedal or a steering wheel. As stated above, the vehicle developer device may be configured as a mini-vehicle that the software developer can write code for and test. For example, the vehicle developer device may have a mini CAN network that is able to actuate interior lights, exterior lights, motors, etc. similar to a real car.

It is noted that the vehicle developer devices described herein are not a specific piece of hardware, but a set of specifications for supported hardware with which related developer tools can offer tight, unified integration and development workflows.

In addition to software such as applications, the vehicle developer systems, devices and methods described herein may include a user interface (UI) developer engine that allows UI developers to natively create, compile, and test vehicle UIs on the vehicle developer device without requiring a test vehicle. UI design applications are complex pieces of software and require significant experience to use effectively. Instead of creating another UI design application just for vehicles, which would require significant development startup costs and user retraining costs, the vehicle developer systems described herein act as a bridge between standard design tools and the vehicle.

A desired feature for UI development is to have the ability to rapidly iterate over different designs to gather user feedback. Traditional vehicle software deployment pipelines do not allow for rapid deployment and iteration. However, the vehicle developer device allows for users to rapidly build, deploy and test changes to real hardware. Designers and engineers may connect the vehicle developer device to their PCs to create, deploy, and interact with application changes quickly and easily.

By way of the vehicle developer device, the UI developer engine has access to sound, seat haptics, sensors, actuators and various HMI features of the vehicle. Developers may use the UI developer engine to develop vehicle user interfaces. The vehicle developer device allows UI developers to test their designs in a simulated vehicle environment using the vehicle developer device. As an example, the vehicle developer device may include a tool that simulates error message to see how the UI under test handles such error messages.

Accordingly, embodiments described herein enable vehicle developers, suppliers, and third parties to quickly iterate and deploy new software and hardware to a vehicle. The tools allow UI teams to test new ideas against real users quickly to create data driven, user centric designs.

The UI developer engine allows designers to create, deploy, and interact with user interfaces quickly and easily. Generally, the UI developer engine includes a software design tool that allows users to import and/or create design assets that are manipulated to create scenes of a user interface.

A non-limiting example of a vehicle user interface 10 is shown in FIG. 1. The example vehicle user interface 10 includes a display 12 that is located along a certain length of the dashboard. The vehicle user interface 10 has various zones for displaying information, such as a first zone 14 for displaying speedometer data and a second zone 16 for displaying environmental information and/or warnings. It should be understood that embodiments are not limited by the vehicle user interface 10 of FIG. 1 and that any number of zones may be provided and any type of information may be displayed.

It should also be understood that vehicle user interfaces are not limited to any one display screen, and may include many interior components, such as multiple displays (e.g., a dash board display as shown in FIG. 1), a heads-up display, a console display, light emitting diode displays, haptic feedback devices, interior lighting, sound system settings, and the like. The overall vehicle user interface may be defined by a plurality of scenes that are defined both by the user as well as the current driving context of the vehicle. As described in more detail below, one scene may be a user receiving a telephone call through the vehicle. The user may define settings of how such calls are to be handled, a designer may have defined the look and feel of the phone call (what is displayed on the screen, the sounds that are made) and how the vehicle peripheral devices (e.g., a cellular modem or a network device that receives a call) themselves transition the user interface between scenes. Thus, many aspects may dictate how a scene is presented to the user by the user interface.

Figure 2:
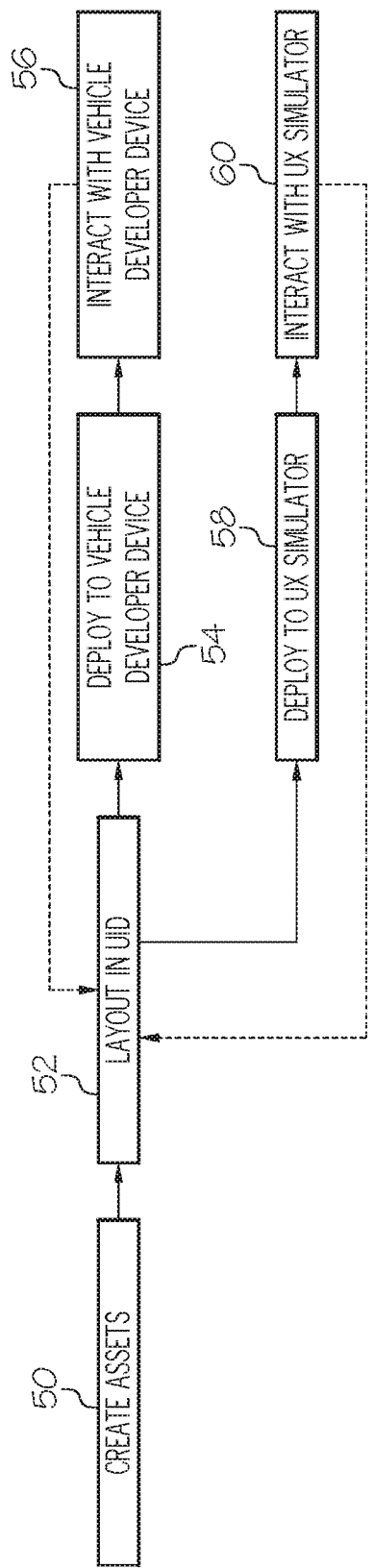
FIG. 2 schematically illustrates an example design process workflow according to one or more embodiments described and illustrated herein.

An example design process workflow using the UI developer engine of an example vehicle developer device of the present disclosure is illustrated by FIG. 2. At block 50, one or more design tools are used to create graphics for a desired user interface. The one or more design tools include a proprietary design tool that is incorporated directly into the UI developer engine, or they may be third party design tools that are used to create UI assets that are imported into a UI design tool at block 52 (e.g., Adobe Photoshop® by Adobe of San Jose, Calif., and Sketch by Sketch B.V. of Eindhoven, the Netherlands).

Design assets are graphical design elements that are arranged to form a scene of a user interface. Design assets may include logos, text, animations, illustrations, or any other imaginable graphical design element. These design assets may be designed by third party tools at block 50 and/or designed within the UI design tool at block 52.

The UI design tool allows the developer to manipulate and lay out how the design assets will be arranged on one or more vehicle displays to form one or more UI scenes. The scenes can be edited with vehicle specific information, such as the type of electronic display or other display device, the number of electronic displays or other display device, and the like. The term scene is used herein to encompass a three-dimensional vehicle environment, where a designer or application can actuate different devices throughout the environment, such as lights, sound, and electronic display devices.

The UI design tool also may compile the various scenes of a user interface into a design project. Thus, the UI design tool assembles all of the scenes into one or more project files that represent the user interface experience of the vehicle.

In some embodiments, the vehicle developer device includes a UI simulator, which receives scenes at block 58 and simulates how scenes generated by the UI design tool will look and react in a vehicle environment. The UI simulator may run on the same computing device as the UI design tool, or may run on a different computing device. At block 60, in some embodiments, the UI simulator may simulate various peripheral inputs and peripheral outputs, error messages, and sensor data to simulate an interaction with the scenes of the UI. For example, the UI simulator may simulate the vehicle receiving a phone call, one or more doors being open, a potential accident, and any other number of situations a vehicle may encounter. Thus, UI simulator may emulate the various ECUs and peripheral devices of the simulated vehicle.

The UI defined by the scenes provided to the UI simulator may be displayed on an electronic display, such as a computer display monitor. In some embodiments, the simulated UI may be displayed on an actual vehicle display cluster that is communicatively coupled to the computing device running the UI simulation.

Feedback from the results of the simulation at block 60 in the form of evaluation data may be provided back to the UI design tool. The feedback may be performance related using metrics, such as how quickly scenes transitioned between one another, if any errors were reported, if the simulated UI affected simulated ECUs, if inputs using the simulated UI were properly received by the simulated ECUs, etc. The feedback may also be subjective. For example, a designer may not like how certain design assets or scenes are displayed and may therefore make changes based on the feedback using the UI design tool.

It should be understood that, although FIG. 2 illustrates a UI simulator, in some embodiments there is no UI simulator provided.

Still referring to FIG. 2, the UI scenes of a project developed at block 52 are provided to a vehicle developer device at block 54, where they are compiled and executed for display on a display or a vehicle cluster. As described in more detail below, the vehicle developer device includes a management computing device that receives the UI project from the design tool, and compiles it into machine readable code that is executable by one or more ECUs of the vehicle developer device. Thus, a developer may quickly deploy UI code to the vehicle developer device for evaluation.

Interactions between the UI scenes of the project and the vehicle hardware of the vehicle developer device occur at block 56. As described within respect to the UI simulator, inputs, outputs, error messages, and sensor data are used to see how the UI scenes perform at block 56. For example, the vehicle developer device may be manipulated to generate inputs to various sensors to prompt situations for the UI scenes. As non-limiting examples, a miniature door of the vehicle developer device may opened, a Bluetooth® signal may be provided to the vehicle developer device that indicates an incoming phone call, the vehicle developer device may be remotely driven on a course that includes other road agents (e.g., vehicles) and situations to simulate actual driving to test various aspects of the UI scenes of the project. For example, the vehicle developer device may be driven or otherwise operated in a scaled environment that provides scaled buildings, roads, road agents (e.g., vehicles, pedestrians, cyclists, and the like), signs, and traffic lights.

Figure 3:
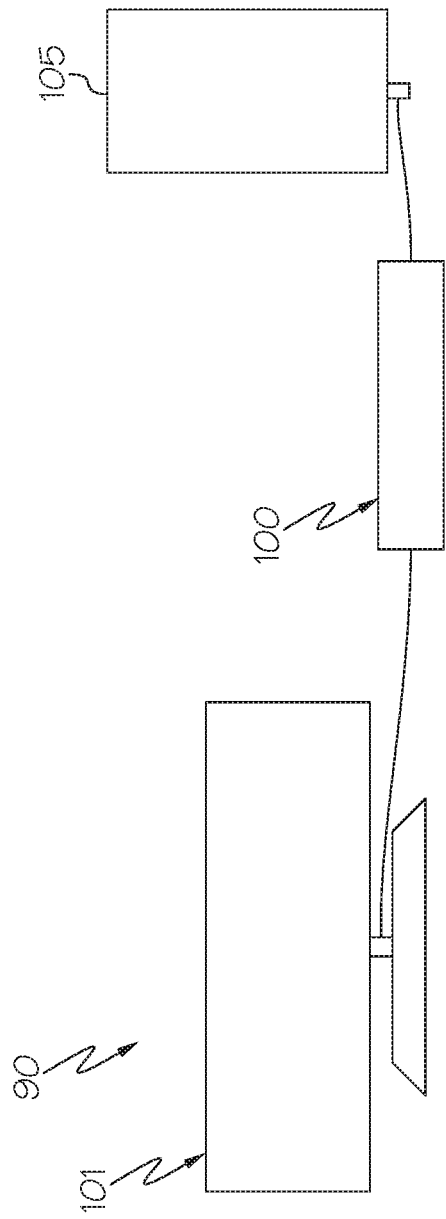
FIG. 3 schematically illustrates an example vehicle developer system according to one or more embodiments described and illustrated herein.

Further, error messages may be generated using the vehicle developer device (e.g., providing unexpected sensor data that generates one or more errors) to see how the UI scenes react. Evaluation information regarding the performance of the UI scenes are fed back to the UI design tool at block 52 where the design may make changes to the scene of the project as described above with respect to the simulator. The evaluation information may include one or more errors, for example An example setup for a vehicle developer system 90 is shown in FIG. 3. Generally, the system 90 comprises a developer computing device 101, a vehicle developer device 100, and an electronic display 105.

The developer computing device 101 runs the UI design tool described above. In some embodiments, it may also include the UI simulator described above with respect to FIG. 2. The developer computing device 101 may be any type of computing device, such, without limitation, as a desktop, a laptop, a tablet, and the like. The developer computing device 101 is communicatively coupled to the vehicle developer device 100 that includes one or more ECUs and provides a miniature version of a vehicle. In some embodiments, the vehicle developer device 100 includes all ECUs, sensors, connectors and actuators of an actual vehicle so that a fully functioning miniature vehicle may be tested. In other embodiments, vehicle ECUs that are not relevant are abstracted away and only relevant ECU hardware is provided. In other words, some ECUs are simulated by software code rather than providing physical ECUs. The vehicle developer device 100 is communicatively coupled to the electronic display device, which may be a computer display monitor, a television, or a vehicle cluster, for example. The electronic display 105 displays the UI scenes as a display output that is outputted by the vehicle developer device 100.

Use of the UI design tool will now be described. A UI application for a particular make and model of a vehicle is contained in a single project. The project is composed of multiple scenes with each scene comprising a plurality of design assets. Each scene represents a different vehicle application (e.g., a scene to handle incoming phone calls, or a scene to display maps/driving directions). Finally, each scene is composed of multiple device output layers (e.g., infotainment, instrument cluster, audio).

Different user interface screens of the UI design tool will now be described. It should be understood that the screens described and illustrated herein are for illustrative purposes only, and do not limit the embodiments described herein. The user interface screens may take on many different configurations.

Figure 4:
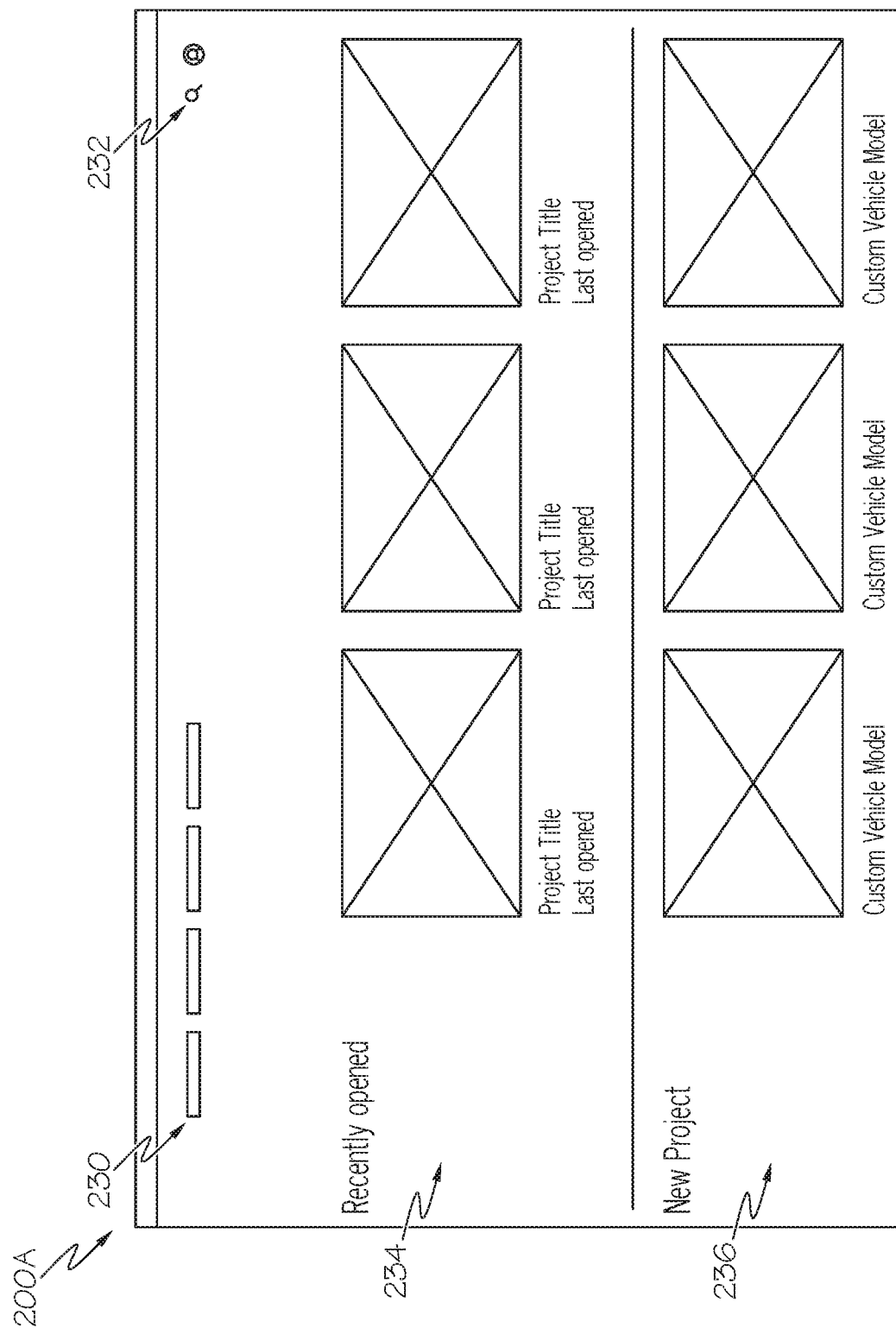
FIG. 4 schematically illustrates an example Home screen of an example user interface (UI) design tool according to one or more embodiments described and illustrated herein.

Referring now to FIG. 4, an example Home screen 200A of a design user interface configured as a UI design tool is depicted. The Home screen 200A may be a first screen that is shown when the application is opened. From the Home screen, a user can open a previous project or create a new project.

In some embodiments, a navigation bar 230 is persistent in all screens of the UI design tool, and allows a user to navigate between screens. A search and user profile feature 232 is provided to enable a user to search for scenes or other information, as well as to view and set preferences in a user profile. A Recently Opened section 234 displays projects that were recently opened by the user. As stated above, an individual project may relate to an individual make and model of a vehicle. Selection of a project opens a project file. A project file contains files for all of UI assets associated with the project, and the metadata to restore the previous application state.

A New Project section 236 allows users to select prepopulated vehicle project profiles, such as a custom vehicle model or a specific vehicle make and model, for example. On selection, the user is prompted for a location for which to create the project. This location is then filled with the project files according to the selected template.

Figure 5:
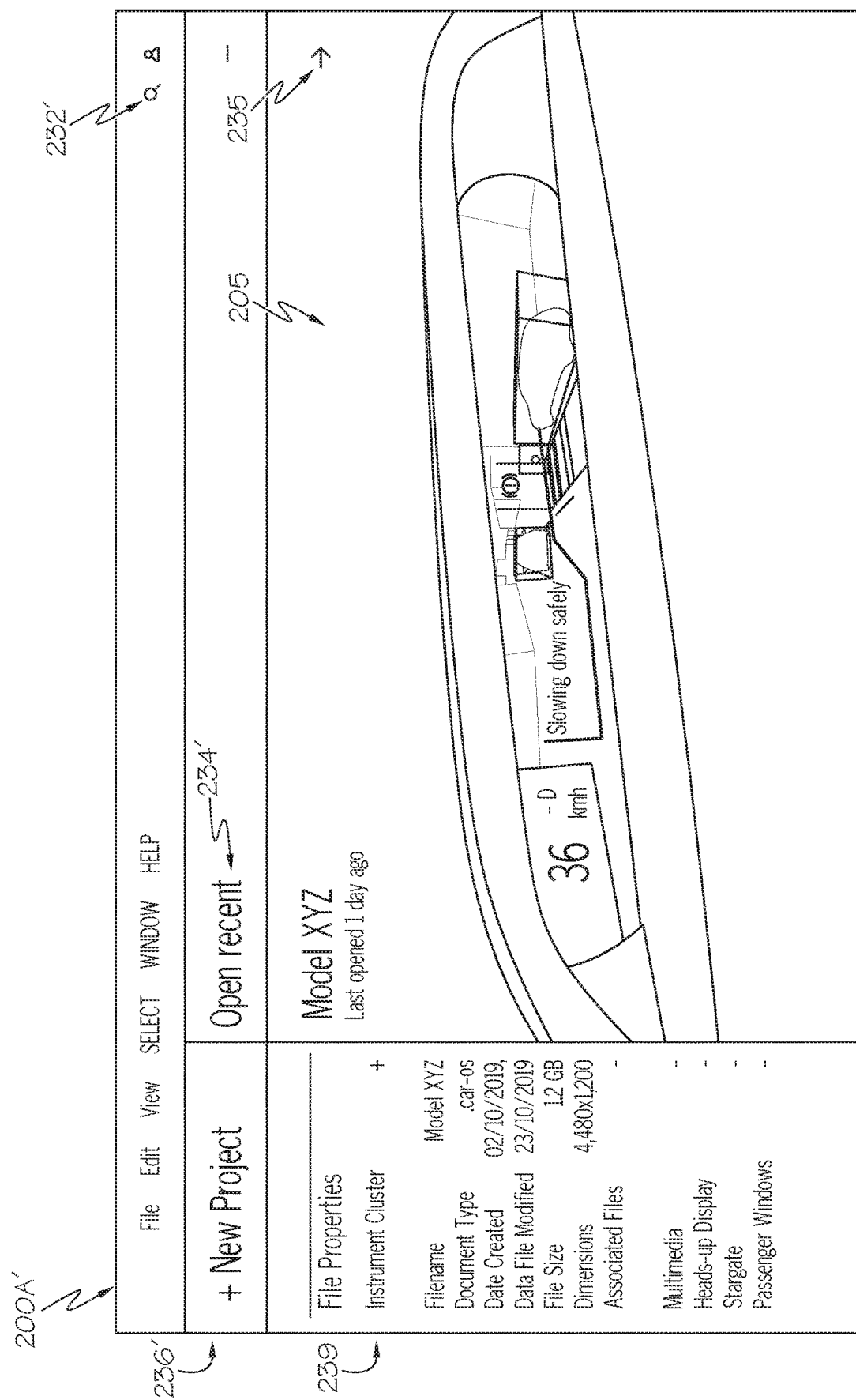
FIG. 5 schematically illustrates another example Home screen of an example UI design tool according to one or more embodiments described and illustrated herein.

Another non-limiting example of a Home screen 200A' that allows a user to create a new project or open a recent project is shown in FIG. 5. The Home screen 200A' illustrated in FIG. 5 shows more detail than the one illustrated in FIG. 4. Similar to the Home screen 200A of FIG. 4, the Home screen 200A' of FIG. 5 includes a search and user profile feature 232', a New Project button 236' that allows a user to create a new project, and a Recently Opened section 234' that allows a user to open recent projects. A Recently Opened preview pane 205 provides a preview of a recently opened project. One or more navigation features 235 allow a user to scroll through various previous of recently opened projects.

Figure 6:
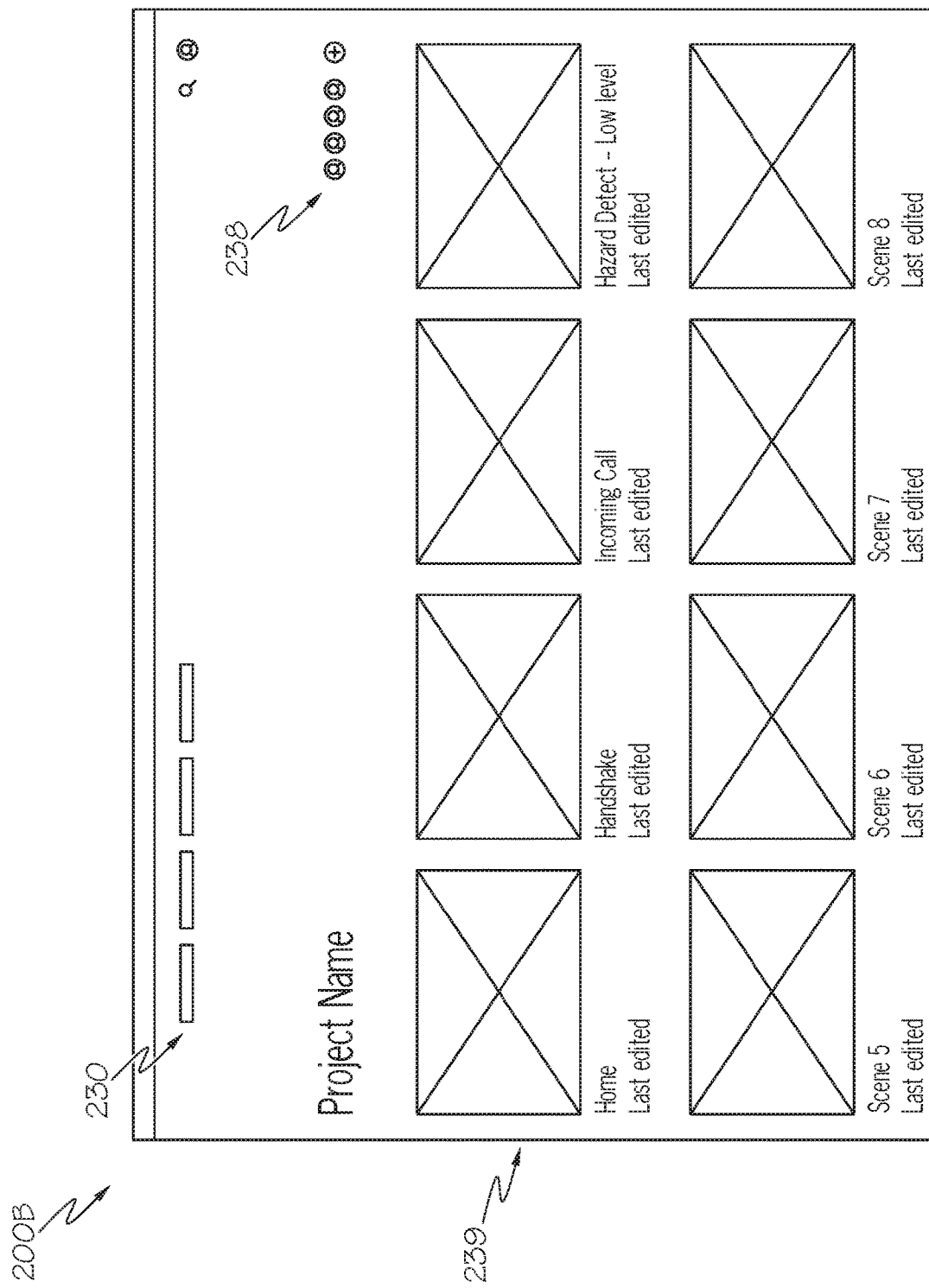
FIG. 6 schematically illustrates an example Project Overview screen of an example UI design tool according to one or more embodiments described and illustrated herein.

After creating a new project or selecting a recent project, the UI design tool is transitioned to the Project Overview screen 200B, an example of which is shown in FIG. 6. From the Project Overview screen 200B, the user may make project level adjustments and select a scene to design or modify. A Scene Selection region 239 includes prepopulated scenes or "moments" that are to be created for the selected vehicle. The "select scene" feature enables a user to select a particular scene to work on inside of the project. FIG. 6 shows non-limiting scenes of "Home," "Handshake," "Incoming Call," and "Hazard Detect-Low level." Any number of scenes may be included in a project. Profiles of users 138 collaborating on the project may also be shown in some embodiments. The date/time of when each scene was last edited may also be displayed.

Figure 7:
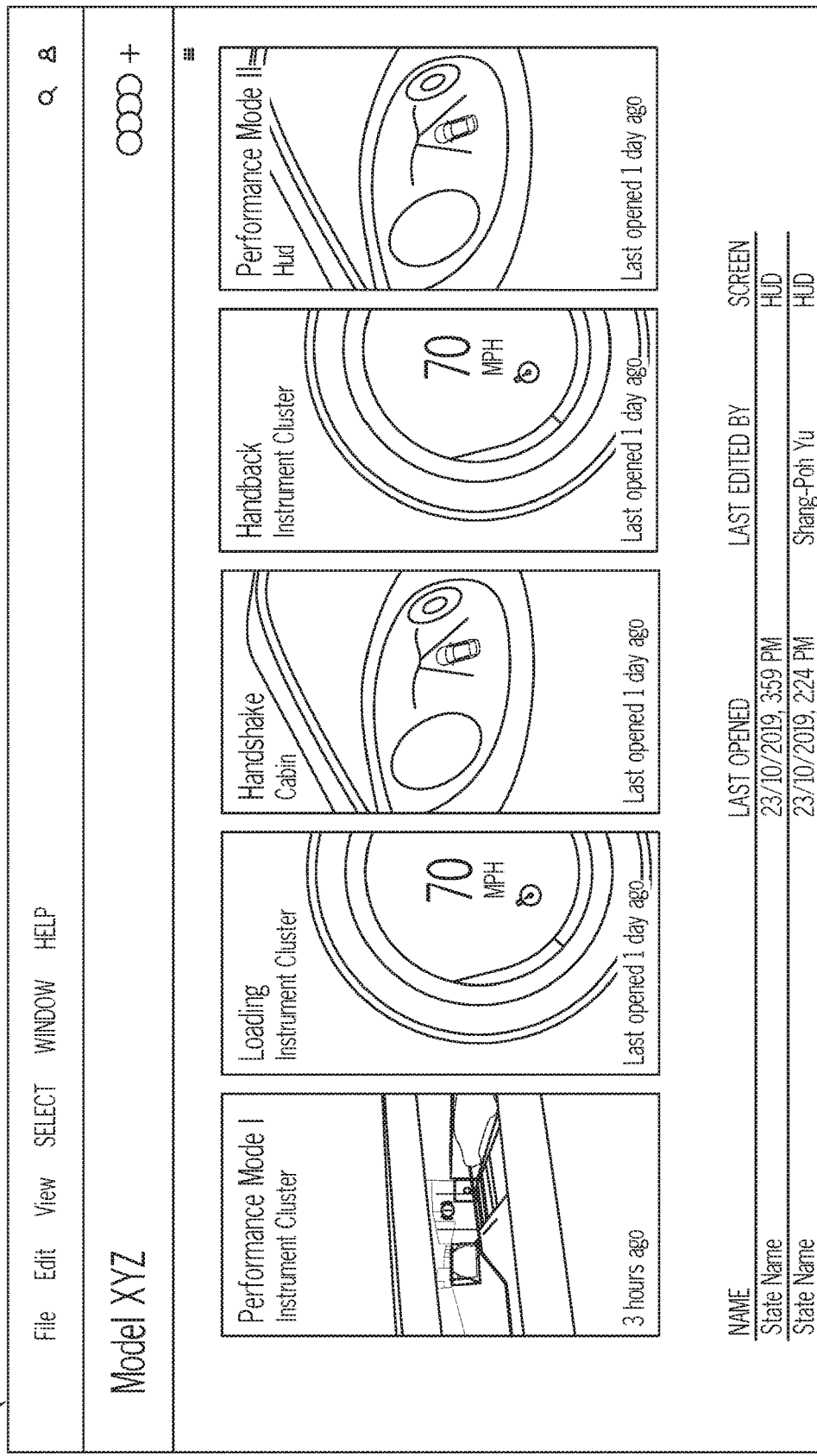
FIG. 7 schematically illustrates another example Project Overview screen of an example UI design tool according to one or more embodiments described and illustrated herein.

Another example of a Project Overview screen 200B' is shown in FIG. 7. The Project Overview screen 200B' provides a Scene Selection region 239' that provides a preview of each of the scenes. A user may select one of the scenes to edit and create that particular scene. An information region 240 may provide information regarding the scene, such as which display(s) the scene is intended for, version history, edit dates, and the like.

Figure 8:
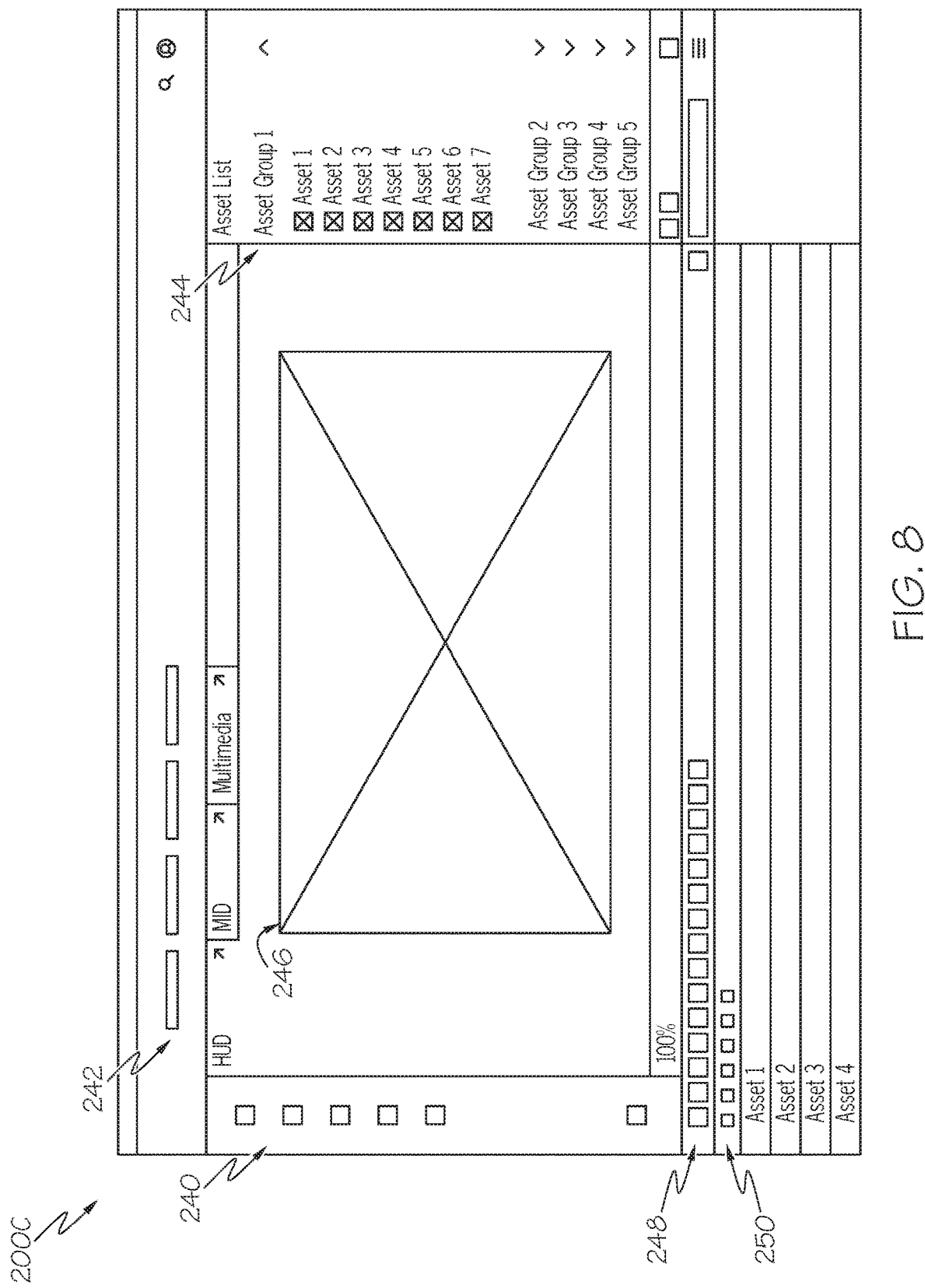
FIG. 8 schematically illustrates an example Design Workspace screen of an example UI design tool according to one or more embodiments described and illustrated herein.

Selection of a scene causes the UI design tool to transition to the Design Workspace screen 200C, such as is shown in FIG. 8. From the Design Workspace screen 200C, a user may import and edit design assets and the data bound to these design assets (e.g., a design asset may be a digital speedometer having data representing speed bound thereto).

For example, design assets created in other design tools may be imported into the Design Workspace screen 200C and manipulated. A user is able to move assets inside the design (drag and drop), resize assets, and make other edits. It should be understood that the Design Workspace screen 200C is provided for illustrative purposes only, and that other configurations are also possible.

A Navigation region 240 allows a user to navigate between various workspaces, such as, without limitation, a development environment, an animation environment to provide animation tools, a file management environment to find design assets, etc. Design assets may be placed in an Artboard region 246 and manipulated per the user's requirements. Thus, the Artboard region 146 provides a work area for the designer.

In the illustrated embodiment, Artboard tabs 242 enable a user to toggle between the screens available in the particular vehicle. For example, a tab may be dedicated to an individual electronic display (e.g., a heads-up display) and selection of the tab may enable selection of scenes that are displayed by that particular electronic display. A Layers region 244 provides a smart grouping system for design assets. For example, certain design assets may be grouped together so that they can be manipulated together. Tools for editing the scene are also provided in a tools region 248. Any number of editing tools may be provided, such as coloring, sizing, morphing, contrast, brightness, and the like. Additionally, a timeline 250 including active layers to sequence may also be provided.

Figure 9:
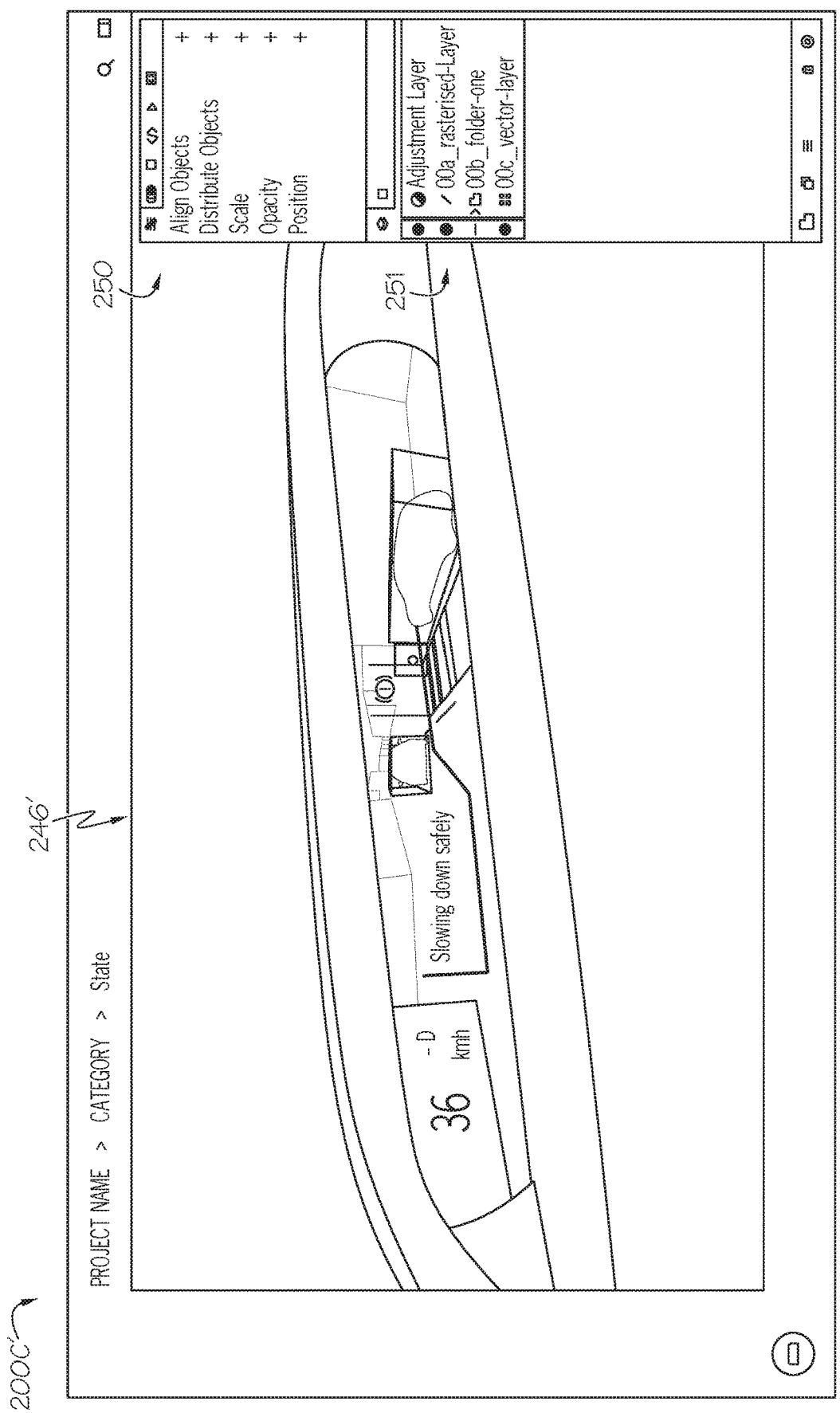
FIG. 9 schematically illustrates another example Design Workspace screen of an example UI design tool according to one or more embodiments described and illustrated herein.

Accordingly, the Design Workspace screen 200C includes all of the functionality needed to design the scenes of the project. Another example Design Workspace screen 200C' is shown in FIG. 9. In the example of FIG. 9, the Design Workspace screen 200C' has an Artboard region 246' for receiving and manipulating design assets. A Tools region 250 provides tools for manipulating the design assets in the Artboard region 246', and a Layers region 251 allows a user to create different layers of the scene and to group various design assets together.

As described above, upon completion of the project design, the project, including all scenes, may be provided to the vehicle developer device for compiling and testing.

Figure 10:
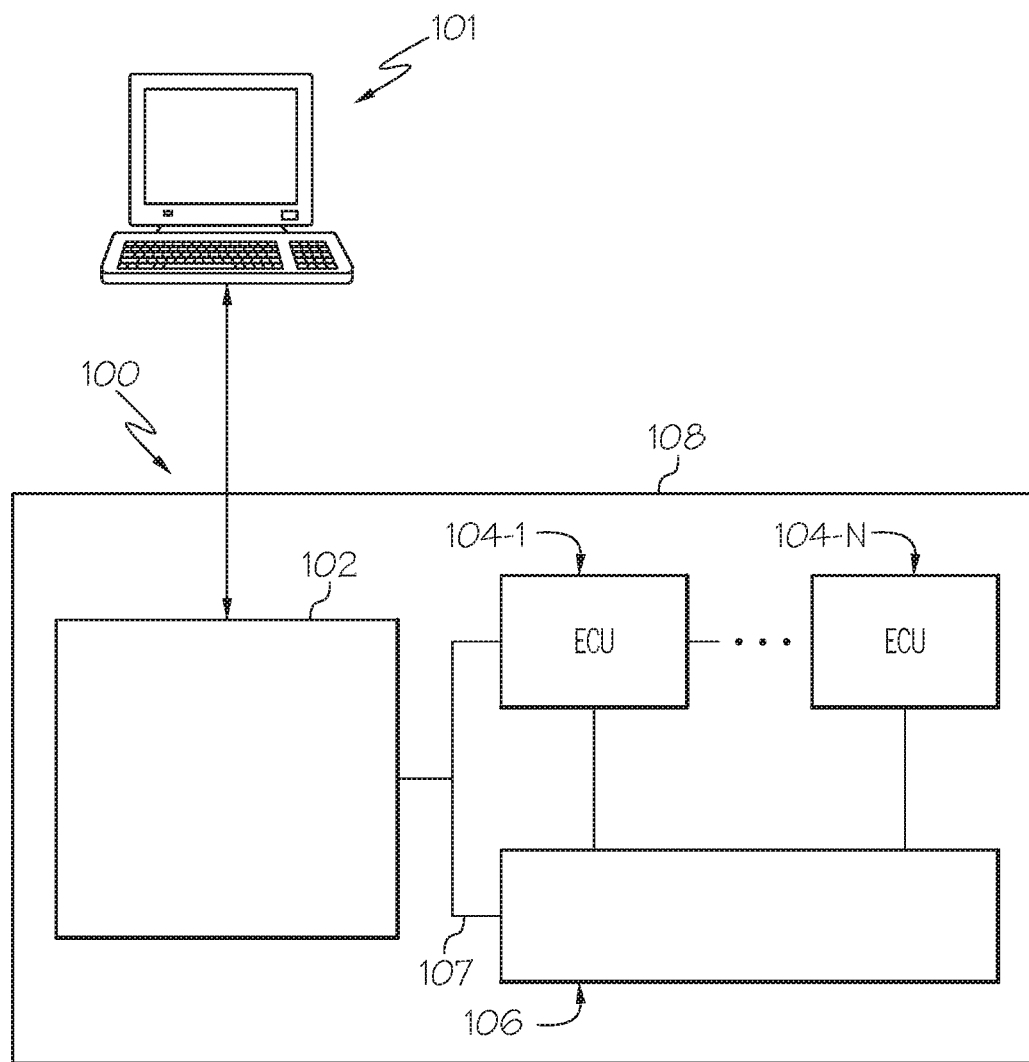
FIG. 10 schematically illustrates internal components of an example vehicle developer device according to one or more embodiments described and illustrated herein.

The vehicle developer device is a hardware component that operates as a miniature version of a full-scale vehicle, and includes ECUs and peripheral devices such as sensors and actuators of an actual vehicle that is being evaluated. The vehicle developer device allows developers to quickly design and evaluate both hardware and software for vehicles. FIG. 10 schematically depicts an example vehicle developer device.

The vehicle developer device 100 is defined by a set of specifications for being connected to a developer computing device 101 (FIG. 3). Hardware built to these specifications can then integrate with other vehicle developer device tools (e.g., the UI design tool) to provide a smooth development workflow and allow designers and developers to quickly test applications and hardware on real vehicle hardware.

The example vehicle developer device 100 comprises three main components: the management computing device 102, target ECU board(s) 104-1-104-N (collectively "104"), and peripheral devices 106. Each ECU board has one or more ECUs associated therewith. The management computing device 102 is controlled via a network connection to a developer computing device 101. For example, the developer computing device 101 may be communicatively coupled to the management computing device 102 by a wired or wireless connection. The target ECU(s), which may include any number and type of ECUs, may be installed and connected to the management computer by any method such as, without limitation, Ethernet.

The management computing device 102 is responsible for communication between the developer computing device 101 and the ECU(s). The management computing device 202 supports remote access and administration over a network connection (e.g., Ethernet from the developer computing device 101 to the management computing device 102). The management computing device 102 also supports tooling to support remotely deploying (from the developer computing device 101) to a connected ECU. From the developer computing device 101, a user is able to run a command to deploy applications to the ECUs (e.g., by the UI design tool). Specifically, the management computing device 101 allows the deploying, running, and interacting with a running application on an ECU of the vehicle developer device 200.

ECU board(s) (e.g., first board ECU 104A and second ECU board 104B) may be connected to the management computing device 102 via Ethernet, and may support any type of vehicle ECU. Non-limiting examples of ECUs include an engine control module, a powertrain control module, brake control module, a central control module, a suspension control module, a transmission control module, a central timing module, a motor control module, a general electronic control module, and an autonomous driving module.

The ECU boards 104 may include sockets to easily insert and remove ECUs for evaluation purposes. For example, when a new ECU is developed, an old ECU may be removed from an ECU board 104 and a new ECU inserted into the sockets of the ECU board 104. Any number of ECU boards 104 may be provided.

The vehicle developer device 100 further includes a communications bus 107 that is the same as the communications bus on the vehicle that is being replicated. As a non-limiting example, the communications bus 107 may be a CAN bus. The ECUs of the vehicle developer device 100 communicate with one another on the communications bus 107.

The ECU board(s) support remote access and administration. For example, from a remote computing device (e.g., the developer computing device 101), a user is able to access the ECUs (e.g., by secure socket shell or other network protocol) by way of the management computing device 102. For example, a user may interact with the management computing device 102 and the ECUs by a simple command-line interface. Thus, a developer is able to interact with an ECU board 104 and its associated ECU for common debug steps.

The ECU board(s) 104 are also operable to run UI and other software applications. Using the developer computing device 101, a user is able to run applications on ECU(s) of one or more ECU boards 104 via the management computing device 102. For example, a user may instruct the management computing device 102 and the ECUs by a command-line interface.

As an example and not a limitation, command-line command(s) may be used to perform the following: 1) compile a software application to run on the vehicle developer device 100, 2) deploy the software application to the vehicle developer device 100, and 3) start the execution of the software application on the vehicle developer device 100. It should be understood that embodiments are not limited to a command-line interface for communication with the management computing device 102 of the vehicle developer device 100.

As a non-limiting example, the software application may be UI project file developed by the UI design tool described above. The user may send the UI project file to the management computing device 102, which then compiles it into machine executable code for delivery and execution by one or more ECUs. For example, the machine executable code may be sent to the intended ECUs over the communications bus 107. As stated above, the UI code may then run on one or more ECUs and other physical vehicle hardware so that the performance of the UI code may be evaluated. The output of the vehicle developer device 100 may be provided on a connected electronic display 105, such as a vehicle cluster (FIG. 3).

Software code other than UI code may be deployed to the ECUs of the vehicle developer device 100 using the management computing device 102. Vehicle ECU code (e.g., engine controller module code), device drivers (e.g., drivers for sensors and actuators), third party applications (e.g., a music streaming service, a video game, a video streaming service, and the like), and the like may be provided to the management computing device 102, which then compiles the software code (also referred to as software modules) and deploys it to the proper ECU(s) and/or peripheral devices.

Thus, a developer is able to easily deploy and test software code on real vehicle hardware without requiring a fully functional vehicle.

Figure 11A:
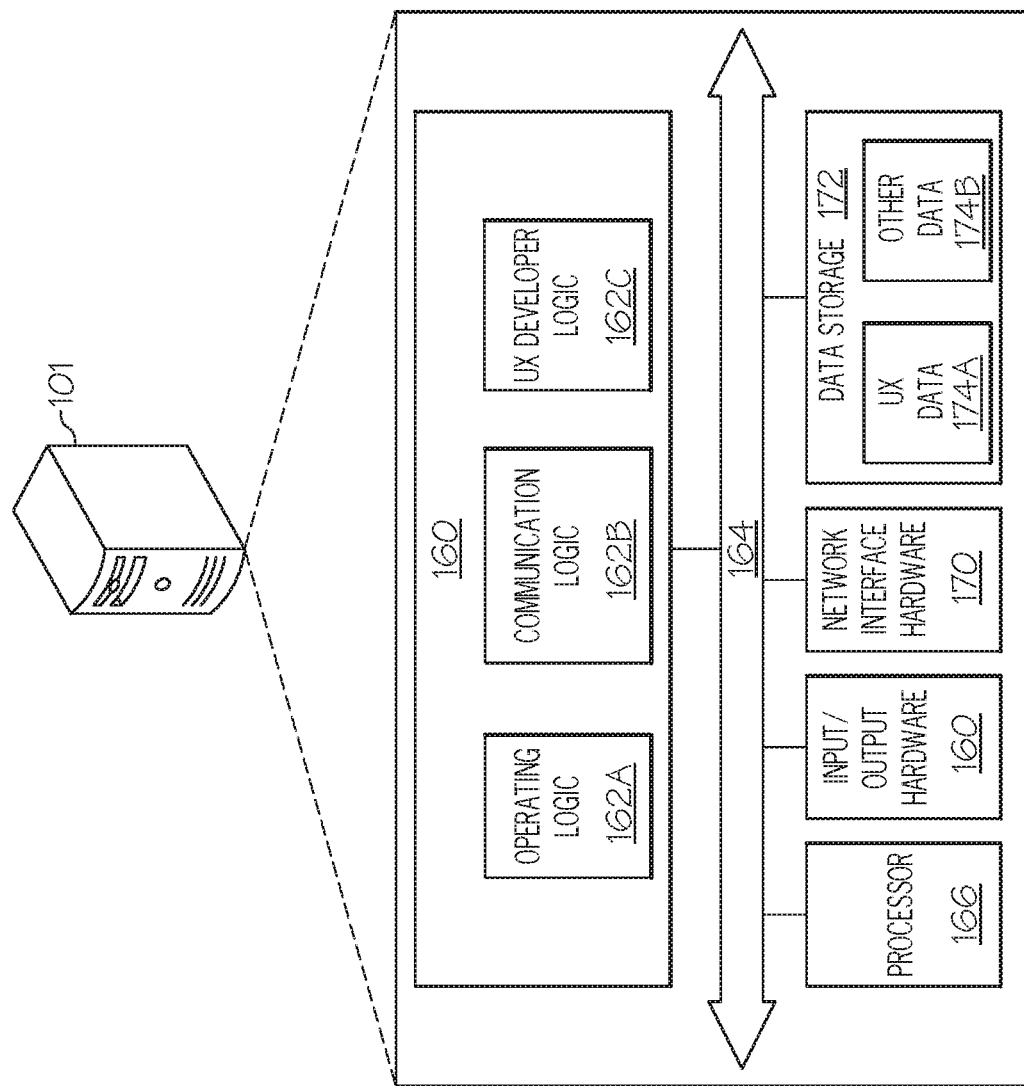
FIG. 11A schematically illustrates a developer computing device of an example vehicle developer device according to one or more embodiments described and illustrated herein.

Referring now to FIG. 11A, a non-limiting example of a developer computing device 101 for communicating with a vehicle developer device is schematically illustrated. While in some embodiments, the developer computing device 101 may be configured as a general purpose computer with the requisite hardware, software, and/or firmware, in some embodiments, the developer computing device 101 may be configured as a special purpose computer designed specifically for performing the functionality described herein. It should be understood that the software, hardware, and/or firmware components depicted in FIG. 11A may also be provided in other computing devices external to the developer computing device 101 (e.g., data storage devices, remote server computing devices, and the like).

As also illustrated in FIG. 11A, the developer computing device 101 (or other additional computing devices) may include a processor 166, input/output hardware 168, network interface hardware 170, a data storage component 172, and a non-transitory memory component 160. The memory component 160 may be configured as volatile and/or non-volatile computer readable medium and, as such, may include random access memory (including SRAM, DRAM, and/or other types of random access memory), flash memory, registers, compact discs (CD), digital versatile discs (DVD), and/or other types of storage components. Additionally, the memory component 110 may be configured to store operating logic 162A, communication logic 162B, and UX developer logic 162C (i.e., UI developer tool logic) (each of which may be embodied as computer readable program code, firmware, or hardware, as an example). A local interface 164 is also included in FIG. 11B and may be implemented as a bus or other interface to facilitate communication among the components of the developer computing device 101.

The processor 166 may include any processing component configured to receive and execute computer readable code instructions (such as from the data storage component 172 and/or memory component 160). The input/output hardware 168 may include an electronic display device, keyboard, mouse, printer, camera, microphone, sound emitting device (e.g., speaker), touch-screen, and/or other device for receiving, sending, and/or presenting data. The network interface hardware 170 may include any wired or wireless networking hardware for communicating with the management computing device 102, such as a modem, LAN port, wireless fidelity (Wi-Fi) card, WiMax card, mobile communications hardware, and/or other hardware for communicating with other networks and/or devices.

It should be understood that the data storage component 172 may reside local to and/or remote from the developer computing device 101, and may be configured to store one or more pieces of data for access by the developer computing device 101 and/or other components. As illustrated in FIG. 11A, the data storage component 172 may include user interface data 174A relating to the UI design tool, which may include, without limitation, design assets. Other data 174B to perform the functionalities described herein may also be stored in the data storage component 172, which may include data for communicating with the management computing device 102 and other data for providing the UI design tool.

Included in the memory component 160 may be operating logic 112A (e.g., an operating system for the developer computing device 101), communication logic 162B for communicating with the management computing device 102, and UX developer logic 162C for providing the UI design tool.

Referring now to FIG. 11B, a schematic illustration of components of an example management computing device 102 is provided. While in some embodiments, the management computing device 102 may be configured as a general purpose computer with the requisite hardware, software, and/or firmware, in some embodiments, the management computing device 102 may be configured as a special purpose computer designed specifically for performing the functionality described herein. It should be understood that the software, hardware, and/or firmware components depicted in FIG. 11B may also be provided in other computing devices external to the management computing device 102 (e.g., data storage devices, remote server computing devices, and the like).

As also illustrated in FIG. 11B, the management computing device 102 (or other additional computing devices) may include a processor 114, network interface hardware 115, input/output hardware 116, a data storage component 117, and a non-transitory memory component 110. The memory component 110 may be configured as volatile and/or non-volatile computer readable medium and, as such, may include random access memory (including SRAM, DRAM, and/or other types of random access memory), flash memory, registers, compact discs (CD), digital versatile discs (DVD), and/or other types of storage components. Additionally, the memory component 110 may be configured to store operating logic 112A, ECU communication logic 112B, and ECU configuration logic 112C (each of which may be embodied as computer readable program code, firmware, or hardware, as an example). A local interface 113 is also included in FIG. 11B and may be implemented as a bus or other interface to facilitate communication among the components of the management computing device 102.

The processor 114 may include any processing component configured to receive and execute computer readable code instructions (such as from the data storage component 117 and/or memory component 110). The input/output hardware 116 may include an electronic display device, keyboard, mouse, printer, camera, microphone, speaker, touch-screen, and/or other device for receiving, sending, and/or presenting data. The network interface hardware 115 may include any wired or wireless networking hardware for communicating with the developer computing device 101, such as a modem, LAN port, wireless fidelity (Wi-Fi) card, WiMax card, mobile communications hardware, and/or other hardware for communicating with other networks and/or devices.

It should be understood that the data storage component 117 may reside local to and/or remote from the management computing device 102, and may be configured to store one or more pieces of data for access by the management computing device 102 and/or other components. As illustrated in FIG. 11B, the data storage component 117 may include ECU data 118A relating to a plurality of ECUs of the vehicle developer device 100. Similarly, configuration data 118B relevant to the ability for the management computing device 102 to configure the plurality of ECUs as well as the peripheral devices of the vehicle developer device 100. Other data 118C to perform the functionalities described herein may also be stored in the data storage component 117.

Included in the memory component 110 may be operating logic 112A (e.g., an operating system for the management computing device 102), the ECU communication logic 112B for communicating with the plurality of ECUs, and ECU configuration logic 112C for providing software code to configured the plurality of ECUs.

As stated herein above, the vehicle developer device 100 may be configured to have all hardware associated with an actual vehicle being simulated. Thus, the vehicle developer device 100 includes a plurality of peripheral devices 106 that may be easily removed and added as needed. As used herein, "peripheral devices" refers to any sensor or actuator of a vehicle. Sensors are devices that provide data back to one or more ECUs, and actuators are components that perform a mechanical motion and/or an electrical response based on one or more instruction signals from one or ECUs.

Figure 12:
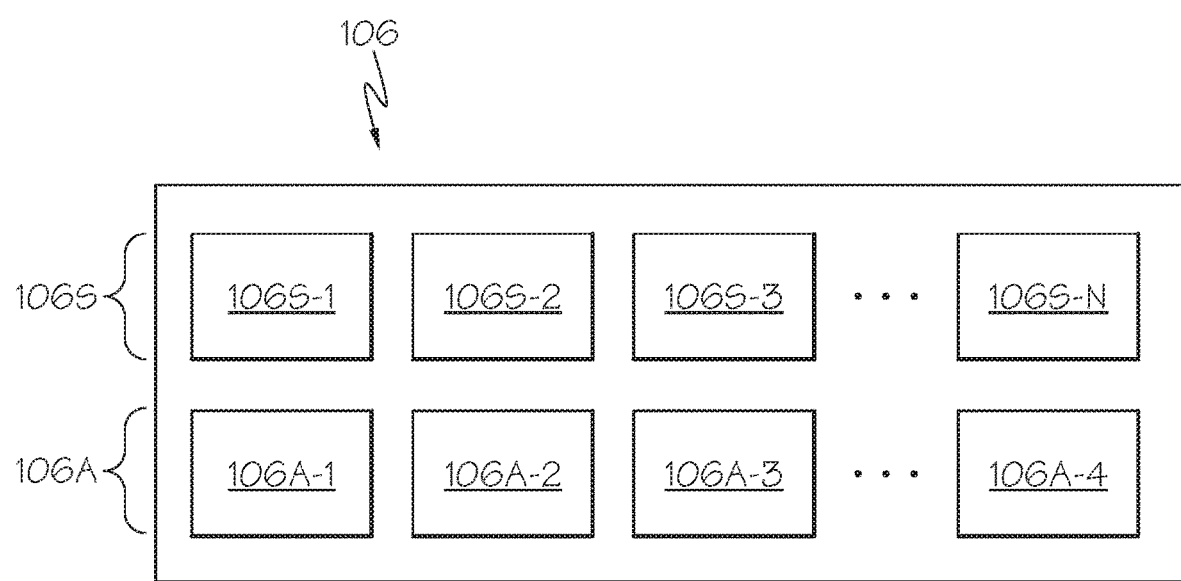
FIG. 12 schematically illustrates peripheral devices according to one or more embodiments described and illustrated herein.

FIG. 12 illustrates a plurality of peripheral devices 106S configured as sensors 106S-1-106S-N and a plurality of peripheral devices 106A configured as actuators 106A-1-106A-N. The sensors 10S6-1-106S-N may be any device capable of sensing the environment and providing a corresponding signal. Non-limiting sensors 106S-1-106S-N include lidar, radar, camera, proximity, contact switch, seatbelt, door, and passenger sensors. The actuators 106A-1-106A-N may be any device capable of reacting to an instruction signal. Non-limiting example actuators 106A-1-106A-N include headlights, brake lights, interior lights, brakes, engine/motor, trunk release, horn, electronic display, climate control components, accelerator input, and the like.

The vehicle developer device 100 includes all peripheral devices 106 of an actual vehicle or some subset of the peripheral devices 106 of the actual vehicle. The peripheral devices 106 may be connected to the vehicle developer device 100 by mating connectors and ports. The peripheral devices 106 may be easily changed for testing and evaluation.

Figure 13:
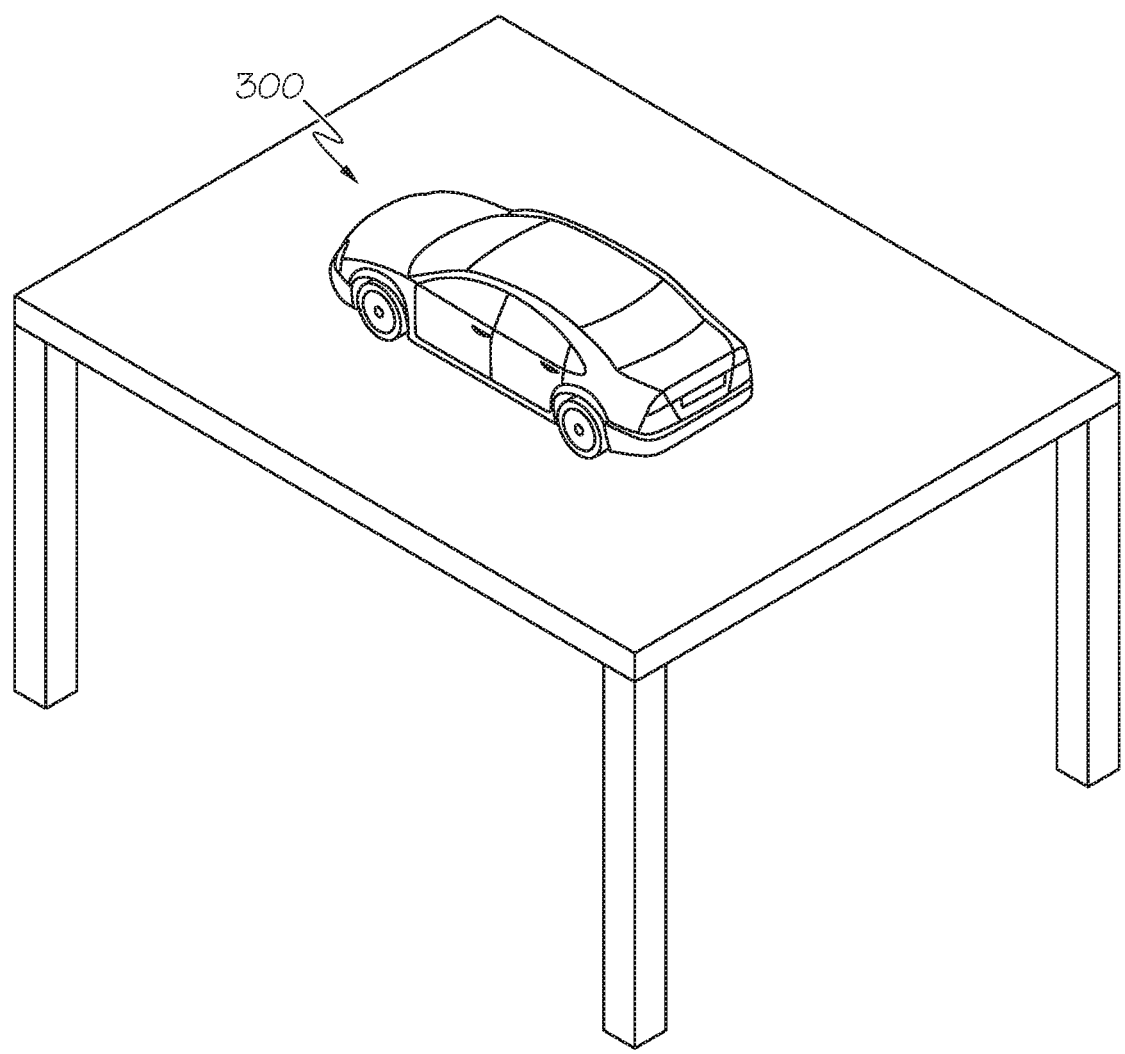
FIG. 13 schematically illustrates an example vehicle developer device configured as a miniature vehicle according to one or more embodiments described and illustrated herein.

In some embodiments, the vehicle developer device 100 is a scaled version (i.e., miniature) of a vehicle under evaluation. As non-limiting examples, the vehicle developer device 100 may be 1:16, 1:8, 1:4 or 1:2 scale of the vehicle under evaluation. Thus, in some embodiments, the vehicle developer device 100 may be operated on a table top for easy evaluation. FIG. 13 is an overhead view of any example vehicle developer device 300 that is a scaled version of an actual vehicle. In other embodiments, the vehicle developer device 100 may not resemble an actual vehicle. In such embodiments, the vehicle developer device 100 may be configured as an evaluation board, for example.

Figure 14:
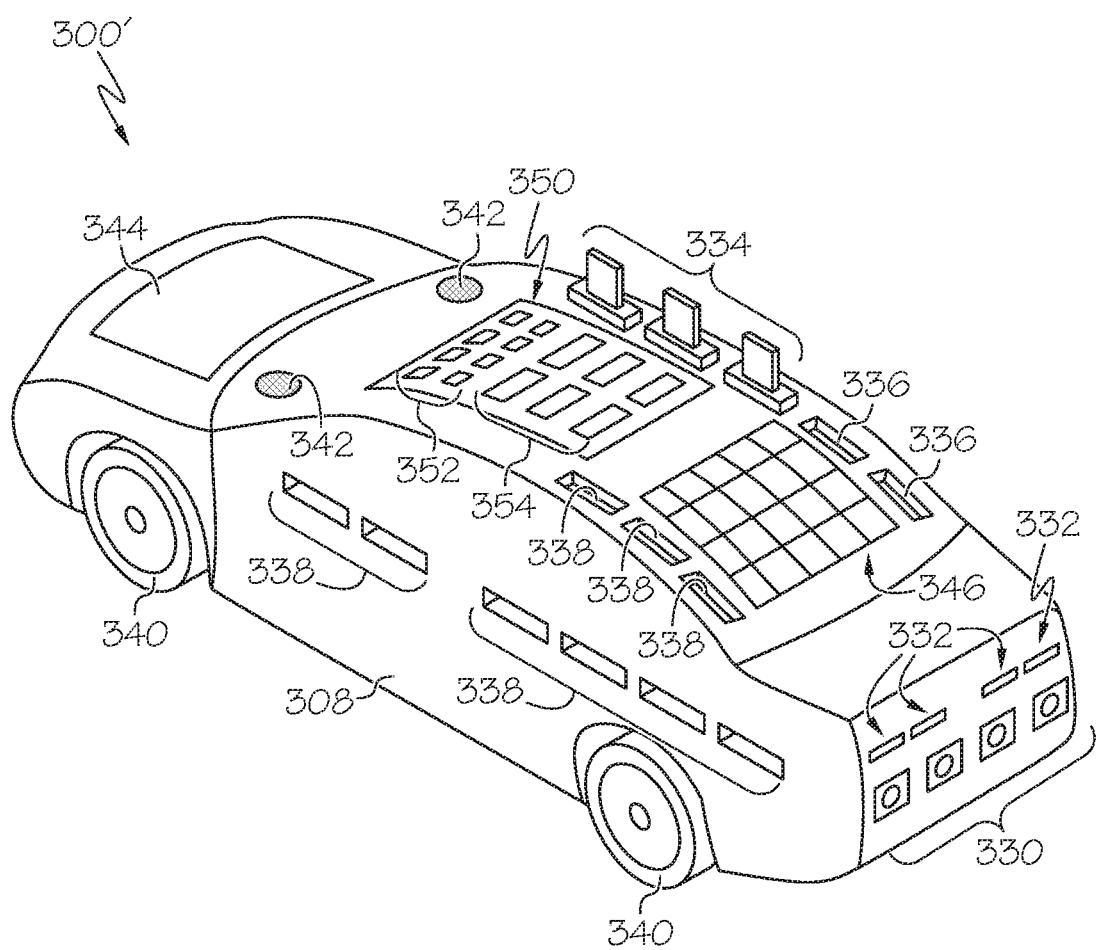
FIG. 14 schematically illustrates another example vehicle developer device configured as a miniature vehicle according to one or more embodiments described and illustrated herein.

Referring now to FIG. 14, a more detailed version of an example vehicle developer device 300' configured as a vehicle is schematically illustrated. The vehicle developer device 300' is capable of being driven and, in some cases, capable of autonomously driving if an autonomous ECU is provided.

The vehicle developer device 300' includes ports and/or connectors to receive various ECUs and peripheral devices. Adapters may be provided to ensure that each ECU and peripheral device may be electrically coupled to the vehicle developer device 300'.

In the illustrated embodiment, an ECU section 350 is provided wherein a plurality of ECU slots 352, 354 are provided. The ECU slots 352, 354 may have different sizes for receiving different ECUs. ECUs may also be provided within a body 308 of the vehicle developer device 300' and/or on the underside of the vehicle developer device 300'. The ECUs that are plugged into the ECU slots 352, 354 are connected to a communications bus, as described above. Traces and or wiring is provided to couple the ECUs and peripheral devices to the communications bus and to one another.

Ports or connectors are provided to receive peripheral devices (i.e., sensors and actuators). In some instances, the peripheral devices are full-sized versions of the sensors and/or actuators. In other instances, a subset of the plurality of the peripheral devices may be miniature representations of the actual vehicle hardware. For example, tail lights may be represented by small light emitting diodes (LED). A steering wheel may be represented by a miniature steering wheel or an electronic steering unit operable to turn the vehicle. An engine may be represented by a small electric motor. The vehicle developer device may therefore be a miniature version of the vehicle being simulated. For example, a body 308 of the vehicle developer device may be a vehicle body with doors, panels, and the like. Developers may create and test software on the vehicle developer device, and even have the vehicle developer device drive around to test different scenarios.

The example vehicle developer device 300' of FIG. 14 includes a plurality of sensor slots 334 that may simulate sensors, such as a seat belt sensor, for example. A developer may press a tab into the sensor slots 334 to simulate a contact switch of a seat belt sensor, for example. Slots 336 are empty and ready to receive a sensor, an actuator, or some other component for evaluation. The example vehicle developer device 300' also includes a plurality of push buttons 346 to simulate actuation of various sensors. For example, a developer may press in one push button to simulate the presence of a driver in the driver seat (e.g., a driver seat sensor), or a door being closed. The push buttons 346 may be used to simulate any contact sensor within an actual vehicle. In some embodiments, the push buttons 346 and/or any other sensor port may be electromechanically controlled so that the developer may program "scenes" for evaluation (e.g., doors opened/closed, passengers present/not present in seats, etc.). This way, the developer may save time by not having to manually set the push buttons 346 and/or other sensor ports.

The example vehicle developer device 300' also includes side slots 338 or ports for receiving additional sensors that may be found on the side of an actual vehicle, such as cameras, for example. Any sensor may be plugged into these side slots 338 for testing and evaluation. Upon insertion, the sensor is coupled to the communications bus and ready to communicate with the ECUs.

The vehicle developer device 300' may also include one or more speakers 342 for simulating an audio system of the vehicle and/or a horn of the vehicle. Wheels 340, a motor/engine (not shown), a steering unit or system (not shown), and a braking unit or system (not shown) is also provided so that the vehicle developer device 300' may be remotely driven and/or may be autonomously driven. In some embodiments, a computing device or a remote controller may provide wireless control signals to simulate user inputs into an actual vehicle. Thus, acceleration, braking, and steering inputs may be provided to the vehicle developer device 300' by a remote control or computing device.

The example vehicle developer device 300' further includes miniature brake and tail lights 332, which may be configured as small LEDs, that represent actual brake lights and tail lights of a full-scale vehicle. Also included are rear proximity sensors 330 that may be actual proximity sensors intended for an actual vehicle. The vehicle developer device 300' may include ports and/or connectors to easily plug in and remove the proximity sensors 330 for testing.

In some embodiments, the vehicle developer device 300' includes one or more electronic displays 344 to display content intended for display within an actual vehicle. For example, the electronic display 344 may display an instrument cluster screen, or a heads up display screen. In some embodiments, the vehicle developer device 300' includes a video-out port for connecting to an external electronic display. In some embodiments, the one or more electronic displays 344 show a status of one or more sensors and/or actuators. For example, the one or more electronic displays 344 may show a graphic indicating a door is opened when a door sensor is indicating that the door is opened. The one or more electronic displays may show that status of any sensor and/or actuator.

Developers may use the vehicle developer device 300' to test and evaluate both software code and hardware devices. Developers may deploy new software and/or hardware to the vehicle developer device, which is operated and provides evaluation data back so that changes can be made, if necessary. As a non-limiting example, a developer of proximity sensors may have developed a new proximity sensor. Rather than testing the new proximity sensor in an actual vehicle, which may be time consuming and costly, the developer may remove the old proximity sensors from the vehicle developer device 300', insert the new proximity sensors, and operate the vehicle developer device 300' to evaluate the performance of the proximity sensor, and to see if the new proximity sensors generate errors. Similarly, and upgraded ECU may be swapped out and tested within the vehicle developer device 300' rather than an actual vehicle. The ability to quickly and easily change hardware components for evaluation significantly decreases the development time to develop new hardware. A developer can test hardware right on the workbench.

It should now be understood that embodiments of the present disclosure are directed to vehicle developer devices and systems that allow a developer to quickly and easily evaluate software code and/or peripheral devices such as sensors and actuators of a vehicle without requiring an actual, full-scale vehicle. A developer computing device communicates directly with a management computing device of a vehicle developer device to interact with the vehicle developer device and deploy software to the vehicle developer device.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A vehicle developer device comprising:
a management computing device;
a plurality of electronic control units;
a plurality of peripheral devices, wherein one or more individual peripheral devices of the plurality of peripheral devices is a physical representation of an actual vehicle peripheral device; and
a plurality of ports for receiving one or more of at least one additional electronic control units and at least one additional peripheral devices, wherein the management computing device configures the plurality of electronic control units and the plurality of electronic control units and the plurality of peripheral devices are physically and removably coupled to the plurality of ports.

2. The vehicle developer device of claim 1, wherein the management computing device is configured to be communicatively coupled to a developer computing device and receive instructions from the developer computing device.

3. The vehicle developer device of claim 2, wherein the instructions comprise one or more software modules, and the management computing device is further configured to compile the one or more software modules into machine executable code for execution by one or more electronic control units of the plurality of electronic control units.

4. The vehicle developer device of claim 1, wherein the plurality of electronic control units comprises one or more of an engine control module, a powertrain control module, a brake control module, a central control module, a suspension control module, a transmission control module, a central timing module, a motor control module, and a general electronic control module.

5. The vehicle developer device of claim 1, wherein the plurality of electronic control units comprises an autonomous driving module comprising one or more processors, and one or more memory modules storing instructions that when executed by the autonomous driving module, causes the vehicle developer device to autonomously drive within an environment.

6. The vehicle developer device of claim 1, wherein the plurality of peripheral devices comprises a plurality of actuators and a plurality of sensors.

7. The vehicle developer device of claim 6, wherein the plurality of sensors comprises sensors intended for installation on a full-scale simulated vehicle.

8. The vehicle developer device of claim 6, wherein the plurality of sensors comprises one or more of a camera, a lidar sensor, a proximity sensor, a passenger sensor, a seatbelt sensor and a door sensor.

9. The vehicle developer device of claim 6, wherein the plurality of actuators comprise one or more of a light emitting device, a sound emitting device, an electronic display, a motor, an electronic steering unit, and a braking unit.

10. The vehicle developer device of claim 6, wherein at least one actuator of the plurality of actuators comprises a light emitting diode as a physical representation of an actual brake light of a full-scale simulated vehicle.

11. The vehicle developer device of claim 6, wherein at least one actuator comprises an electronic display, and the management computing device controls the electronic display such that it displays a status of one or more sensors of the plurality of sensors.

12. The vehicle developer device of claim 1, wherein the vehicle developer device is a scaled representation of a full-size vehicle.

13. A method of evaluating a peripheral device, the method comprising:
physically coupling an individual peripheral device to a vehicle developer device, the vehicle developer device comprising:
a management computing device;
a plurality of electronic control units;
a plurality peripheral devices, wherein one or more peripheral devices of the plurality of peripheral devices is a physical representation of an actual vehicle peripheral device; and
a plurality of ports for receiving one or more of at least one additional electronic control units and at least one additional peripheral devices,
wherein:
the individual peripheral device is coupled to an individual port of the plurality of ports;
the management computing device configures the plurality of electronic control units;
physically operating the vehicle developer device; and
evaluating an operation of at least one of the vehicle developer device and the individual peripheral device according to one or more performance metrics.

14. The method of claim 13, wherein the management computing device is configured to be communicatively coupled to a developer computing device and receive instructions from the developer computing device.

15. The method of claim 14, further comprising providing, using the developer computing device, computer readable instructions to the management computing device, wherein the instructions comprise one or more software modules, and the management computing device compiles the software application into machine executable code for execution by one or more electronic control units of the plurality of electronic control units.

16. The method of claim 13, wherein the plurality of peripheral devices comprises a plurality of actuators and a plurality of sensors.

17. The method of claim 16, further comprising interacting with one or more actuators of the plurality of actuators, wherein the interaction of the one or more actuators causes a change in the operation of the vehicle developer device.

18. The method of claim 16, wherein the plurality of sensors comprises sensors intended for installation on a full-scale simulated vehicle.

19. The method of claim 16, further comprising operating the vehicle developer device in a scaled environment to receive data from at least some sensors of the plurality of sensors.

20. The method of claim 13, wherein the vehicle developer device is a scaled representation of a full-size vehicle.

* * * * *